United States Patent
Kim et al.

(10) Patent No.: US 11,281,233 B2
(45) Date of Patent: Mar. 22, 2022

(54) PLATOONING CONTROLLER, A SYSTEM INCLUDING THE SAME, AND A METHOD THEREOF

(71) Applicants: HYUNDAI MOTOR COMPANY, Seoul (KR); KIA MOTORS CORPORATION, Seoul (KR)

(72) Inventors: Il Hwan Kim, Hwaseong-si (KR); Hong Gi Park, Seoul (KR); Sang Yeob Lee, Seongnam-si (KR); Seung Hyun Kim, Seoul (KR); Dong Hyuk Kim, Hwaseong-si (KR); Kyung Joo Bang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 155 days.

(21) Appl. No.: 16/906,949

(22) Filed: Jun. 19, 2020

(65) Prior Publication Data
US 2021/0116937 A1 Apr. 22, 2021

(30) Foreign Application Priority Data
Oct. 18, 2019 (KR) .......................... 10-2019-0130197

(51) Int. Cl.
*G05D 1/02* (2020.01)
*G08G 1/00* (2006.01)

(52) U.S. Cl.
CPC ......... *G05D 1/0293* (2013.01); *G05D 1/0248* (2013.01); *G05D 1/0257* (2013.01);
(Continued)

(58) Field of Classification Search
CPC .. G05D 1/0293; G05D 1/0248; G05D 1/0257; G05D 1/0289; G05D 1/0295; G05D 2201/0213; G05D 1/0291; G08G 1/22; B60W 2050/0005; B60W 30/165; B60W 40/02; B60W 50/0205; B60W 50/14; B60W 60/001; B60W 2050/0215; B60W 2420/42; B60W 2420/52; B60W 2554/00; B60W 2554/801; B60K 35/00; B60K 2370/152; B60K 2370/175; B60R 21/0134; G01S 13/931; G01S 17/931; B60Y 2306/15
See application file for complete search history.

(56) References Cited

U.S. PATENT DOCUMENTS 8,831,820 B2 9/2014 Sato
2010/0256852 A1* 10/2010 Mudalige ................. G08G 1/22
701/24
(Continued)

*Primary Examiner* — Donald J Wallace
(74) *Attorney, Agent, or Firm* — Lempia Summerfield Katz LLC

(57) ABSTRACT

A platooning controller, a vehicle system including the same, and a method thereof include a communicator configured to transmit and receive sensor breakdown information between vehicles in a platooning line and include a processor configured to rearrange the platooning line depending on breakdown of sensors of the vehicles in the platooning line based on the sensor breakdown information. The processor assigns a number according to a location of a vehicle in the platooning line depending on a type, a location, and/or a sensing range of a broken sensor and rearranges the vehicle in a location corresponding to the number.

20 Claims, 11 Drawing Sheets

(52) U.S. Cl.
CPC ......... *G05D 1/0289* (2013.01); *G05D 1/0295* (2013.01); *G08G 1/22* (2013.01); *G05D 2201/0213* (2013.01)

(56) References Cited

U.S. PATENT DOCUMENTS

| | | |
|---|---|---|
| 2018/0188746 A1* | 7/2018 | Lesher .................... G08G 1/22 |
| 2019/0025819 A1* | 1/2019 | Ferguson ............... G08G 1/167 |
| 2019/0073908 A1* | 3/2019 | Neubecker ....... G08G 1/096725 |
| 2019/0196501 A1* | 6/2019 | Lesher ................ G05D 1/0289 |
| 2020/0057453 A1* | 2/2020 | Laws ...................... G08G 1/22 |
| 2020/0201356 A1* | 6/2020 | Schuh ....................... B60T 7/12 |
| 2020/0324763 A1* | 10/2020 | Switkes ................ G08G 1/167 |
| 2020/0324768 A1* | 10/2020 | Switkes ................ G08G 1/202 |
| 2020/0349850 A1* | 11/2020 | Park ........................ H04W 4/46 |
| 2021/0331674 A1* | 10/2021 | Eriksson ................. G08G 1/22 |

* cited by examiner

PLATOONING CONTROLLER, A SYSTEM INCLUDING THE SAME, AND A METHOD THEREOF

CROSS-REFERENCE TO RELATED APPLICATION

This application claims the benefit of priority to Korean Patent Application No. 10-2019-0130197, filed in the Korean Intellectual Property Office on Oct. 18, 2019, the entire contents of which are incorporated herein by reference.

TECHNICAL FIELD

The present disclosure relates to a platooning controller, a system including the same, and a method thereof. More particularly, the present disclosure relates to technologies of controlling a platooning line based on a type and a location of a broken sensor in a platooning vehicle.

BACKGROUND

Platooning is a technology, in which a plurality of vehicles performs autonomous driving in a state that the plurality of vehicles is arranged at a specified interval in line. While the plurality of vehicles is platooning, a leading vehicle, which is a vehicle located in the frontline of a platooning line, may control one or more following vehicles, which follow the leading vehicle. The leading vehicle may maintain the interval between or among the plurality of vehicles included in the platooning line. The leading vehicle may further exchange information about behaviors and situations of the plurality of vehicles included in the platooning line using vehicle-to-vehicle (V2V) communication. The leading vehicle may further perform a platooning control using information collected through its sensor.

The existing technology determines vehicle arrangement in a platooning line and controls platooning, with regard to ambient sensing capability for each platooning vehicle. However, the existing technology has a limitation that it is impossible to cope with platooning control and keeping when a sensor breaks down.

SUMMARY

The present disclosure has been made to solve the above-mentioned problems occurring in the prior art while advantages achieved by the prior art are maintained intact.

An aspect of the present disclosure provides a platooning controller for rearranging a platooning line with regard to types, locations, sensing ranges, and the like of one or more sensors when the one or more sensors of platooning vehicles break down and maintaining platooning, a system including the same, and a method thereof.

Another aspect of the present disclosure provides a platooning controller for changing and applying a leading vehicle, which collects and integrates type and location information of a sensor which breaks down and controls a location in the platooning line through V2V communication, in a flexible manner to prevent authority of platooning control from being duplicated or confused, a system including the same, and a method thereof.

The technical problems to be solved by the present inventive concept are not limited to the aforementioned problems, and any other technical problems not mentioned herein will be clearly understood from the following description by those having ordinary skill in the art to which the present disclosure pertains.

According to an aspect of the present disclosure, a platooning controller may include: a communicator configured to transmit and receive sensor breakdown information between vehicles in a platooning line and a processor configured to rearrange the platooning line depending on breakdown of sensors of the vehicles in the platooning line based on the sensor breakdown information. The processor may assign a number according to a location of a vehicle in the platooning line depending on one or more of a type, a location, and/or a sensing range of a broken sensor and may rearrange the vehicle in a location corresponding to the number.

In an embodiment, the processor may rearrange a vehicle, including a broken front radar, in a location of a leading vehicle in the platooning line when the rearranged vehicle, having the broken front radar, is present among the sensors of the vehicles.

In an embodiment, the processor may hand over a control authority of an old leading vehicle to the rearranged vehicle, including the broken front radar when the rearranged vehicle, having the broken front radar, moves to the location of the leading vehicle.

In an embodiment, the processor may rearrange a vehicle, including a broken camera, in a location of a following vehicle in the platooning line when the vehicle, having the broken camera, is present among the sensors of the vehicles.

In an embodiment, the processor may rearrange a vehicle, including a broken blind spot radar, in a location of a tail end vehicle among following vehicles in the platooning line when the rearranged vehicle, having the broken blind spot radar, is present among the sensors of the vehicles.

In an embodiment, the processor may rearrange a vehicle, including a broken front light detection and ranging (LiDAR), in a location of a tail end vehicle among following vehicles in the platooning line or a location of a leading vehicle in the platooning line when the rearranged vehicle, having the broken front LiDAR, is present among the sensors of the vehicles.

In an embodiment, the processor may rearrange the vehicle, including the broken front LiDAR, in the location of the tail end vehicle among the following vehicles in the platooning line when no other vehicle, having a broken sensor, is present among the vehicles in the platooning line.

In an embodiment, the processor may control the vehicle, including the broken front LiDAR and rearranged in the location of the tail end vehicle among the following vehicles in the platooning line, to maintain a maximum inter-vehicle distance.

In an embodiment, the processor may rearrange the vehicle, including the broken front LiDAR, in the location of the leading vehicle in the platooning line when another vehicle, having a broken blind spot radar, is present among the vehicles in the platooning line.

In an embodiment, the processor may control the rearranged vehicle, including the broken front LiDAR, to depart from the platooning line when another vehicle, having a broken blind spot radar, and another vehicle, having a broken front radar, are present among the vehicles in the platooning line.

In an embodiment, the platooning controller may further include a display configured to display information for platooning.

According to another aspect of the present disclosure, a vehicle system may include: a sensing device configured to sense a periphery of a host vehicle and a platooning controller configured to transmit and receive sensor breakdown information between vehicles in a platooning line and rearranges the platooning line depending on breakdown of sensors of the vehicles in the platooning line based on the sensor breakdown information. The platooning controller may assign a number according to a location of a vehicle in the platooning line depending on one or more of a type, a location, and/or a sensing range of a broken sensor and may rearrange the vehicle in a location corresponding to the number.

In an embodiment, the sensing device may include a front radar configured to sense a long range obstacle in front of the host vehicle, a camera configured to obtain lane information, a blind spot radar configured to sense an obstacle approaching to a rear end of the host vehicle, and a front LiDAR configured to sense a collision with an obstacle in front of the host vehicle.

In an embodiment, the platooning controller may rearrange a vehicle, including a broken front radar, in a location of a leading vehicle in the platooning line and may hand over a control authority of an old leading vehicle to the rearranged vehicle, having the broken front radar, when the rearranged vehicle, having the broken front radar, is present among the sensors of the vehicles.

In an embodiment, the platooning controller may rearrange a vehicle, including a broken camera, in a location of a following vehicle in the platooning line when the rearranged vehicle, having the broken camera, is present among the sensors of the vehicles.

In an embodiment, the platooning controller may rearrange a vehicle, including a broken blind spot radar, in a location of a tail end vehicle among following vehicles in the platooning line when the rearranged vehicle, having the broken blind spot radar, is present among the sensors of the vehicles.

In an embodiment, the platooning controller may rearrange a vehicle, including a broken front LiDAR, in a location of a tail end vehicle among following vehicles in the platooning line or a location of a leading vehicle in the platooning line when the rearranged vehicle, having the broken front LiDAR, is present among the sensors of the vehicles.

According to another aspect of the present disclosure, a platooning control method may include: transmitting and receiving sensor breakdown information between vehicles in a platooning line, assigning a number according to a location of a vehicle in the platooning line depending on one or more of a type, a location, and/or a sensing range of a broken sensor based on the sensor breakdown information, and rearranging the vehicle in a location corresponding to the number.

In an embodiment, the assigning of the number according to the location of each vehicle may include rearranging a vehicle, including a broken front radar, in a location of a leading vehicle in the platooning line and handing over a control authority of an old leading vehicle to the rearranged vehicle, having the broken front radar, when the rearranged vehicle, having the broken front radar, is present among sensors of the vehicles.

In an embodiment, the assigning of the number according to the location of each vehicle may include rearranging a vehicle, including a broken camera, in a location of a following vehicle in the platooning line when the rearranged vehicle, having the broken camera, is present among sensors of the vehicles.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
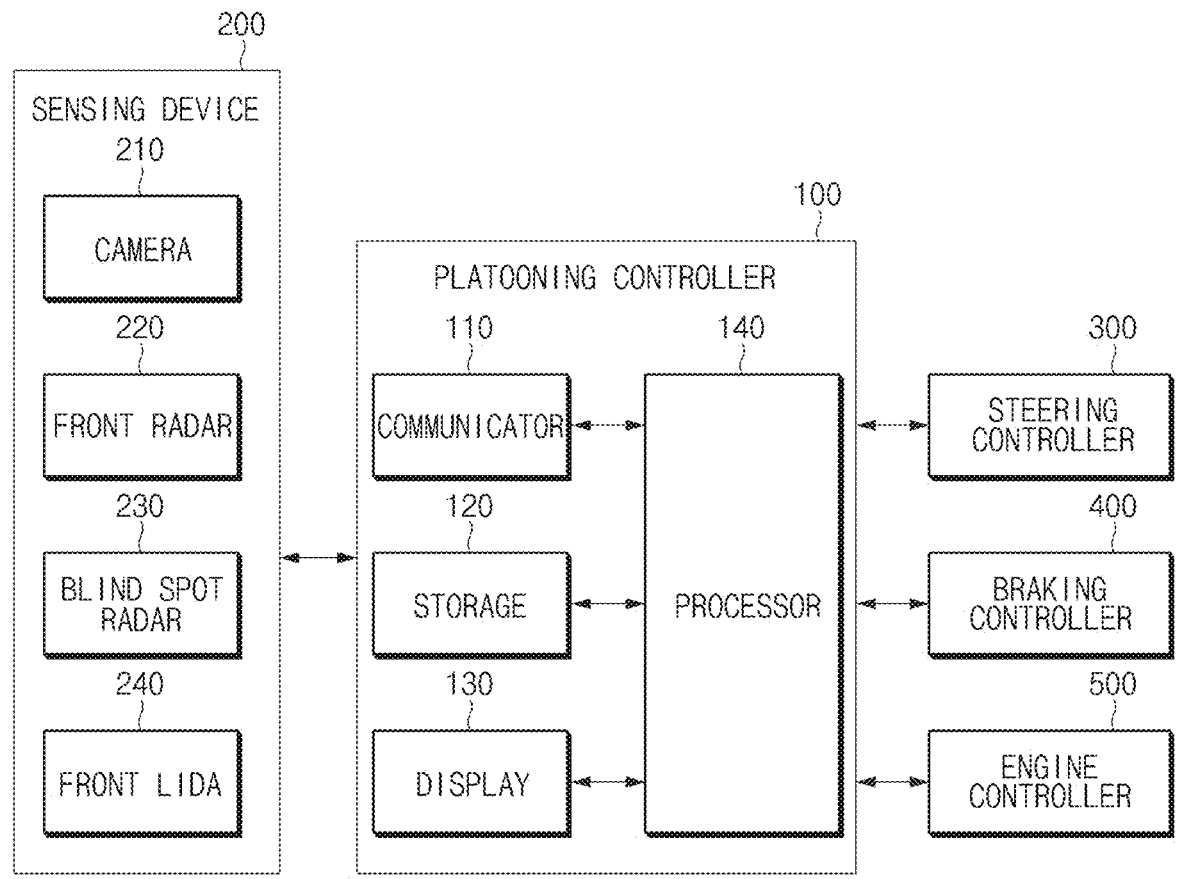
FIG. 1 is a block diagram illustrating a configuration of a vehicle system including a platooning controller according to an embodiment of the present disclosure.

Hereinafter, some embodiments of the present disclosure are described in detail with reference to the drawings. In adding the reference numerals to the components of each drawing, it should be noted that an identical or equivalent component is designated by an identical numeral even when they are displayed on other drawings. Further, in describing an embodiment of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component. Such terms do not limit the nature, sequence or order of the constituent components. Unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings equal to the contextual meanings in the relevant field of art. Such terms are not to be interpreted as having ideal or excessively formal meanings unless clearly defined as having such in the present application.

When each of several types of sensors for advanced driver assistance systems (ADAS) breaks down or when sensors of several vehicles break down at the same time, an embodiment of the present disclosure may disclose technologies capable of maintaining platooning. The sensor may be, for example, a front radar, a camera, a blind spot radar, a light detection and ranging (LiDAR), or the like. The platooning is maintained by rearranging a platooning line with regard to a type of the broken sensor, a location of the broken sensor, a sensing range of the broken sensor, and the like.

Hereinafter, a description is given in detail of embodiments of the present disclosure with reference to FIGS. 1 and 11.

A leading vehicle (LV) and a following vehicle (FV), which are included in a platooning group, may perform platooning on the road. The LV and the FV may travel while maintaining a specified distance. While the LV and the FV are traveling, the LV or the FV may adjust the distance between the LV and the FV based on sensor information and platooning information shared through a vehicle-to-vehicle (V2V) communication.

FIG. 1 is a block diagram illustrating a configuration of a vehicle system including a platooning controller according to an embodiment of the present disclosure.

Referring to FIG. 1, the vehicle system according to an embodiment of the present disclosure may include a platooning controller 100, a sensing device 200, a steering controller 300, a braking controller 400, and an engine controller 500.

The platooning controller 100 according to an embodiment of the present disclosure may be implemented in a host vehicle. In this embodiment, the platooning controller 100 may be integrally configured with control units in the host vehicle. In another embodiment, the platooning controller 100 may be implemented as a separate device to be connected with the control units of the host device by a separate connection means.

The platooning controller 100 may transmit and receive sensor breakdown information between vehicles in a platooning line. The platooning controller 100 may further rearrange the platooning line depending on breakdown of sensors of the vehicles in the platooning line based on the sensor breakdown information. In other words, the platooning controller 100 may assign a number according to a location in a platooning line depending on one or more of a type, a location, and/or a sensing range of a broken sensor. The platooning controller 100 may further rearrange the vehicle in a location corresponding to the number.

The platooning controller 100 may include a communicator 110, a storage 120, a display 130, and a processor 140.

The communicator 110 may be a hardware device implemented with various electronic circuits to transmit and receive a signal through a wireless or wired connection. In an embodiment, the communicator 110 may perform inter-vehicle communication through vehicle network communication. For example, the vehicle network communication may be controller area network (CAN) communication, local interconnect network (LIN) communication, Flex-Ray communication, or the like.

The communicator 110 may perform wireless communication with a server outside the host vehicle, an infrastructure outside the host vehicle, another vehicle in a platooning line, or the like. In an embodiment, the communicator 110 may transmit and receive sensor breakdown information with vehicles in a platooning line. In this embodiment, the communicator 110 may perform vehicle-to-infrastructure (V2I) using wireless internet technology or short range communication. In this embodiment, the wireless internet technology may include wireless local area network (WLAN), wireless broadband (WiBro), wireless-fidelity (Wi-Fi), world interoperability for microwave access (WiMAX), or the like. Furthermore, the short range communication technology may include Bluetooth, ZigBee, ultra wideband (UWB), radio frequency identification (RFID), infrared data association (IrDA), or the like.

The storage 120 may store a sensing result of the sensing device 200 and data and algorithms necessary for an operation of the processor 140, or the like.

In an embodiment, the storage 150 may store platooning information such as sensor breakdown information received via the communicator 110 from vehicles in the platooning line. Furthermore, the storage 150 may store information about an obstacle, for example, a preceding vehicle, sensed by the sensing device 200.

The storage 120 may include at least one type of storage medium, such as a flash memory type memory, a hard disk type memory, micro type memory, a card type memory (e.g., a secure digital (SD) card or an extreme digital (XD) card), random access memory (RAM), a static RAM (SRAM), a read-only memory (ROM), a programmable ROM (PROM), an electrically erasable PROM (EEPROM), a magnetic RAM (MRAM), magnetic disk, and an optical disk.

The display 130 may include an input means for receiving a control command from a user and an output means for outputting an operation state and result of the platooning controller 100. In this embodiment, the input means may include a key button and may further include a mouse, a joystick, a jog-shuttle, a stylus pen, or the like. Furthermore, the input means may further include a soft key implemented on a display. The output means may include the display and may further include a sound output means such as a speaker. In this embodiment, when a touch sensor such as a touch film, a touch sheet, or a touch pad is provided in the display, the display may operate as a touch screen. The display may be implemented in a form where the input means and the output means are integrated with each other. In an embodiment of the present disclosure, the output means may output platooning information such as sensor breakdown information, leading vehicle information, platooning line information, a platooning speed, a destination, a stop, or a path.

In this embodiment, the display may include at least one of a liquid crystal display (LCD), a thin film transistor-LCD (TFT-LCD), an organic LED (OLED) display, a flexible display, a field emission display (FED), and/or a three-dimensional (3D) display.

The processor 140 may be electrically connected with the communicator 110, the storage 120, the display 130, or the like. The processor 140 may electrically control the respective components. The processor 140 may be an electrical circuit configured to execute instructions of software and may perform a variety of data processing and calculation described below.

The processor 140 may process a signal delivered between the respective components of the platooning controller 100.

The processor 140 may rearrange a platooning line depending on breakdown of sensors of vehicles in the platooning line based on the sensor breakdown information.

When a vehicle, including a broken front radar, is present among the sensors of the vehicles, the processor 140 may rearrange the vehicle, having the broken front radar, in a location of a leading vehicle in the platooning line.

When the rearranged vehicle, including the broken front radar, moves to the location of the leading vehicle, the processor 140 may hand over a control authority of an old leading vehicle to the rearranged vehicle, having the broken front radar.

When a vehicle, including a broken camera, is present among the sensors of the vehicles, the processor 140 may rearrange the vehicle, having the broken camera, in a location of a following vehicle in the platooning line.

When a vehicle, including a broken blind spot radar, is present among the sensors of the vehicles, the processor 140 may rearrange the vehicle, having the broken blind spot radar, in a location of a tail end vehicle among following vehicles in the platooning line.

When a vehicle, including a broken front LiDAR is present, among the sensors of the vehicles, the processor 140 may rearrange the vehicle, having the broken front LiDAR, in a location of a tail end vehicle among following vehicles in the platooning line or a location of a leading vehicle in the platooning line.

When no another vehicle, including a broken sensor, is present among vehicles in the platooning line, the processor 140 may rearrange the vehicle, having the broken front LiDAR, in the location of the tail end vehicle among the following vehicles in the platooning line.

When another vehicle, including a broken blind spot radar, is present among the vehicles in the platooning line, the processor 140 may rearrange the vehicle, having the broken front LiDAR, in the location of the leading vehicle in the platooning line.

When another vehicle, including a broken blind spot radar, and another vehicle, having a broken front radar, are present among the vehicles in the platooning line, the processor 140 may control the rearranged vehicle, having the broken front LiDAR, to depart from the platooning line.

The processor 140 may rearrange the vehicle, including the broken front LiDAR and having a degraded collision avoidance function, in the location of the leading vehicle or the location of the following vehicle at the tail end. In this embodiment, when the vehicle is rearranged in the location of the following vehicle at the tail end, the processor 140 may control the vehicle, having the broken front LiDAR, to travel while maintaining a maximum inter-vehicle distance. In this embodiment, the inter-vehicle distance control step may be classified as a first step, a second step, a third step, or a fourth step of a headway state. The first step may have a shortest inter-vehicle distance. The inter-vehicle distance may be increased in an order of the second step, the third step, and the fourth step. In an embodiment of the present disclosure, the controlling to maintain the maximum inter-vehicle distance may include a controlling by using the fourth step of the headway state.

The sensing device 200 may include one or more sensors configured to detect an obstacle located around the host vehicle, for example, a preceding vehicle or a following vehicle. The one or more sensors may be further configured to measure a distance from the obstacle and/or a relative speed with the obstacle.

To this end, the sensing device 200 may include a camera 210, a front radar 220, a blind spot radar 230, a front LiDAR 240, or the like. The front radar 220 may be a long range radar. The blind spot radar 230 may be a medium and short range radar. The camera 210 may capture a lane to obtain lane information. The front LiDAR 240 may measure a time when a laser pulse is reflected and returned after being emitted to the earth's surface and a preceding vehicle to measure whether there is a collision with the host vehicle. Thus, a collision with the host vehicle may be avoided.

In addition, the sensing device 200 may further include an ultrasonic sensor, a laser scanner and/or a corner radar, an acceleration sensor, a yaw rate sensor, a torque sensor and/or a wheel speed sensor, a steering angle sensor, or the like.

The steering controller 300 may be configured to control a steering angle of the host vehicle. The steering controller 300 may include a steering wheel, an actuator interlocked with the steering wheel, and a controller for controlling the actuator.

The braking controller 400 may be configured to control to brake the host vehicle and may include a controller for controlling a brake.

The engine controller 500 may be configured to control to drive an engine of the host vehicle and may include a controller for controlling a speed of the host vehicle.

Figure 2:
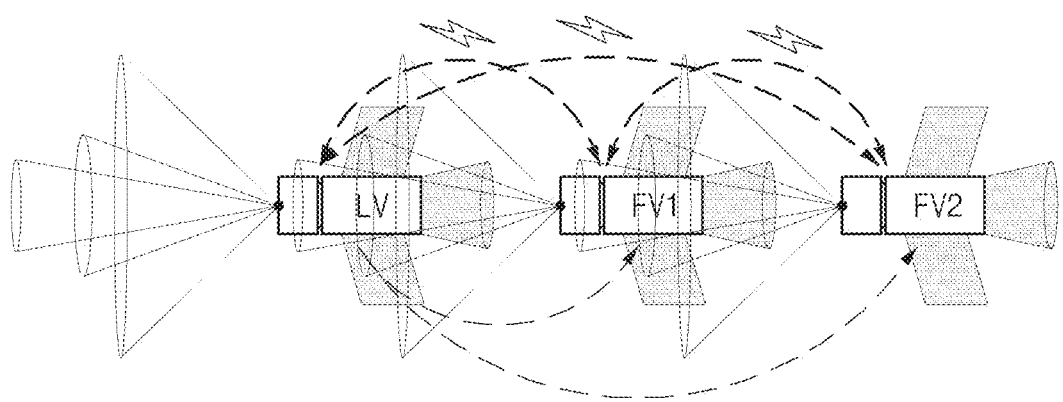
FIG. 2 is a drawing illustrating a sensor and communication operation environment during platooning of vehicles according to an embodiment of the present disclosure.
Figure 3:
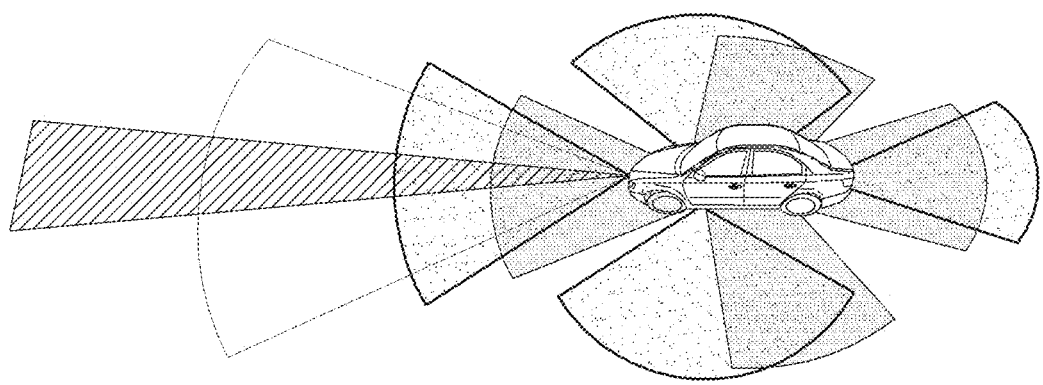
FIG. 3 is a drawing illustrating a sensing range of a sensing device according to an embodiment of the present disclosure.
Figure 3:
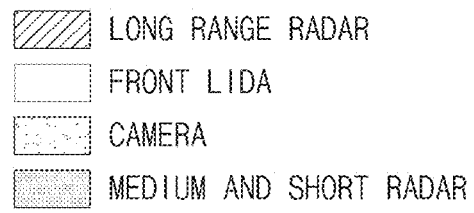

FIG. 2 is a drawing illustrating a sensor and communication operation environment during platooning of vehicles according to an embodiment of the present disclosure. FIG. 3 is a drawing illustrating a sensing range of a sensing device according to an embodiment of the present disclosure.

Referring to FIG. 2, platooning vehicles LV, FV1 and FV2 may perform platooning control based on their own sensors loaded into the vehicles and platooning information transmitted among the platooning vehicles LV, FV1 and FV2 through communication. As shown in FIG. 3, a front radar among sensors loaded into a vehicle may be a long range radar configured to detect a long range obstacle in front of the vehicle. A front LiDAR may have a sensing range shorter than the front radar and longer than a blind spot radar. The front LiDAR may detect a collision in front of the vehicle. A camera may capture and recognize a lane around the vehicle. The blind spot radar may be a medium and short range radar configured to detect an obstacle approaching to a rear side of the vehicle.

Figure 4:
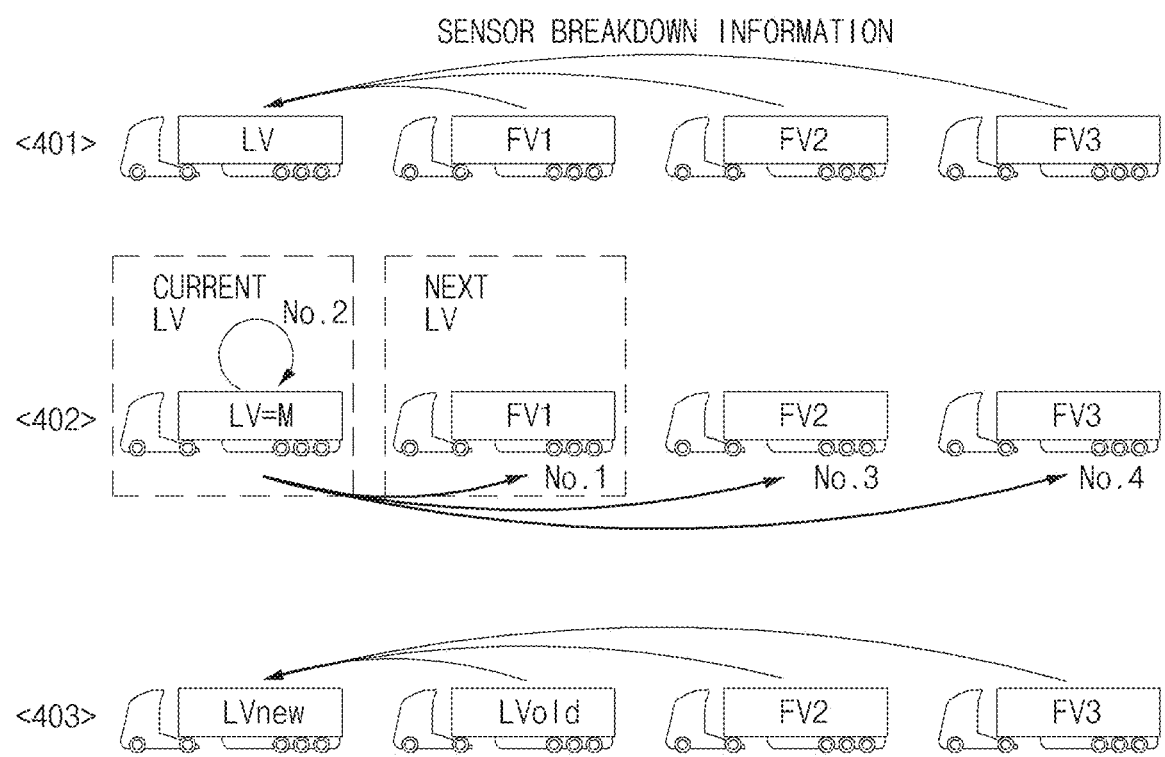
FIG. 4 is a drawing illustrating a specific screen, on which a platooning line is rearranged according to sensor breakdown information of platooning vehicles, according to an embodiment of the present disclosure.

FIG. 4 is a drawing illustrating a specific screen, on which a platooning line is rearranged according to sensor breakdown information of platooning vehicles, according to an embodiment of the present disclosure.

Referring to reference numeral 401 of FIG. 4, a leading vehicle LV and following vehicles FV1, FV2, and FV3, which are platooning, may transmit and receive sensor breakdown signal through a vehicle-to-vehicle (V2V) communication.

Referring to reference numeral 402 of FIG. 4, the leading vehicle LV may receive the sensor breakdown information of all the following vehicles FV1, FV2, and FV3. The leading vehicle LV may further assign a number for each location. For example, the leading vehicle LV may assign No. 1 to the leading vehicle LV located at the forefront. The leading vehicle LV may further assign No. 2 to the following vehicle FV1 in a second location. The leading vehicle LV may further assign No. 3 to the following vehicle FV2 in a third location. The leading vehicle LV may further assign No. 4 to the following vehicle FV3 in a fourth location.

Thereafter, when it is difficult to detect the front because a front radar of the following vehicle FV1 breaks down, the following vehicle FV1 may be designated as a new leading vehicle LVnew. As shown in reference numeral 403, the new leading vehicle LVnew may move to the forefront. An old leading vehicle LVold may hand over its control authority to the new leading vehicle LVnew and may move behind the new leading vehicle LVnew to travel.

Hereinafter, a description is given in detail of a method for forming a platoon including vehicles again depending on a type of a broken sensor, with reference to Table 1 below and FIGS. 5 to 8.

TABLE 1

| Broken sensor | Problems | Determine suitable location | Determine location in line |
|---|---|---|---|
| Front radar | It is impossible to sense a forward vehicle. | It is difficult to function as FV. LV is possible. | LV |
| Camera | Warn lane departure because it is impossible to obtain lane information. It is impossible to perform lane keeping function. | It is dangerous to function as LV. Thus, it is arranged in a location of FV. | FV |
| Blind spot radar | Change a lane because it is impossible to sense a vehicle approaching to a rear side and contain a probability of risk when departing from a platooning line. | Arranged in a location of a tail end vehicle, which does not positively need to perform a lane change when departing from a platooning line. | Tail end FV |
| Front LiDAR | Deteriorate in function such as emergency braking or collision avoidance. | Because there is deterioration in collision avoidance function, a location of a middle FV is unsuitable. | LV or tail end FV (Should travel using fourth step of headway state) |

Figure 5:
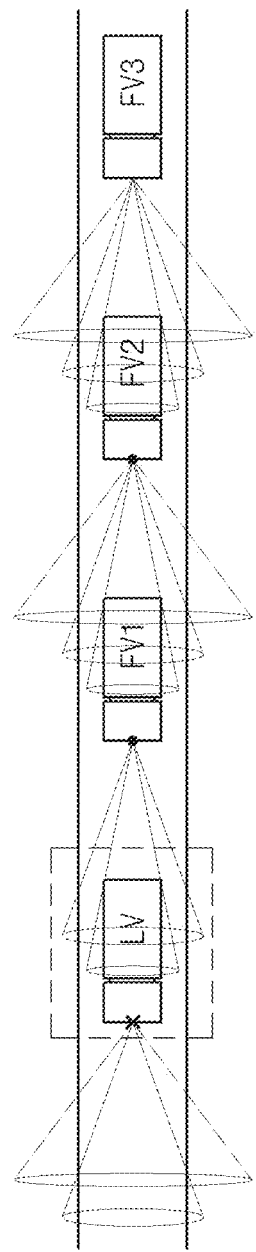
FIG. 5 is a drawing illustrating a specific screen, on which a platooning line is rearranged when a front radar breaks down, according to an embodiment of the present disclosure.

FIG. 5 is a drawing illustrating a specific screen, on which a platooning line is rearranged when a front radar breaks down, according to an embodiment of the present disclosure.

Referring to FIG. 5 and Table 1 above, because it is possible for a vehicle, including a broken front radar, among platooning vehicles to detect a front target, a platoon may be formed again such that the vehicle, having the broken front radar, is located at the forefront of a platooning line.

Figure 6:
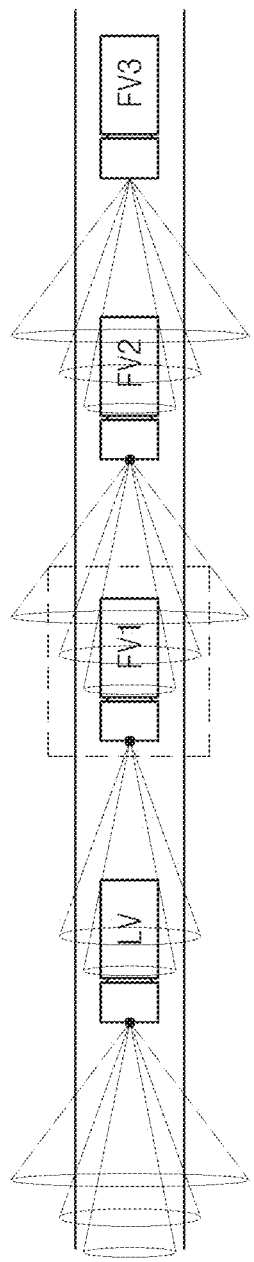
FIG. 6 is a drawing illustrating a specific screen, on which a platooning line is rearranged when a camera breaks down, according to an embodiment of the present disclosure.

FIG. 6 is a drawing illustrating a specific screen, on which a platooning line is rearranged when a camera breaks down, according to an embodiment of the present disclosure.

Referring to FIG. 6 and Table 1 above, because it is impossible for a vehicle, including a broken, among platooning vehicles to detect a lane, it may fail to perform a lane departure warning system (LDWS), a lane keeping assist system (LKAS), or the like. Thus, because it is difficult for the vehicle, having the broken camera, to play a role as a leading vehicle, the vehicle, having the broken camera, may be rearranged in a location of a following vehicle. In FIG. 6, an embodiment is exemplified as the vehicle, having the broken camera, is rearranged as a following vehicle FV1 in a second location.

Figure 7:
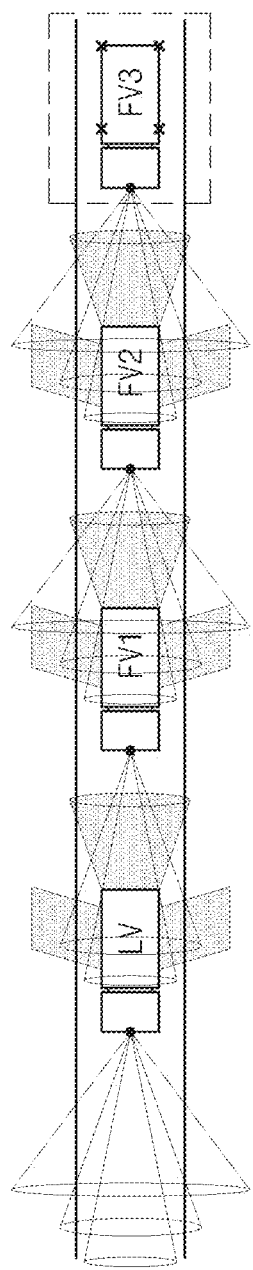
FIG. 7 is a drawing illustrating a specific screen, on which a platooning line is rearranged when a blind spot radar breaks down, according to an embodiment of the present disclosure.

FIG. 7 is a drawing illustrating a specific screen, on which a platooning line is rearranged when a blind spot radar breaks down, according to an embodiment of the present disclosure.

Referring to FIG. 7 and Table 1 above, because it is impossible for a vehicle, including a broken blind spot radar, among platooning vehicles to detect a vehicle approaching to a rear side, the vehicle, having the broken blind spot radar, may cause a critical situation when there is a lane change and when departing from a platooning line. Thus, the vehicle, having the broken blind spot radar, may be rearranged as a following vehicle FV4 at a tail end in the platooning line, which does not need a lane change during platooning.

Figure 8:
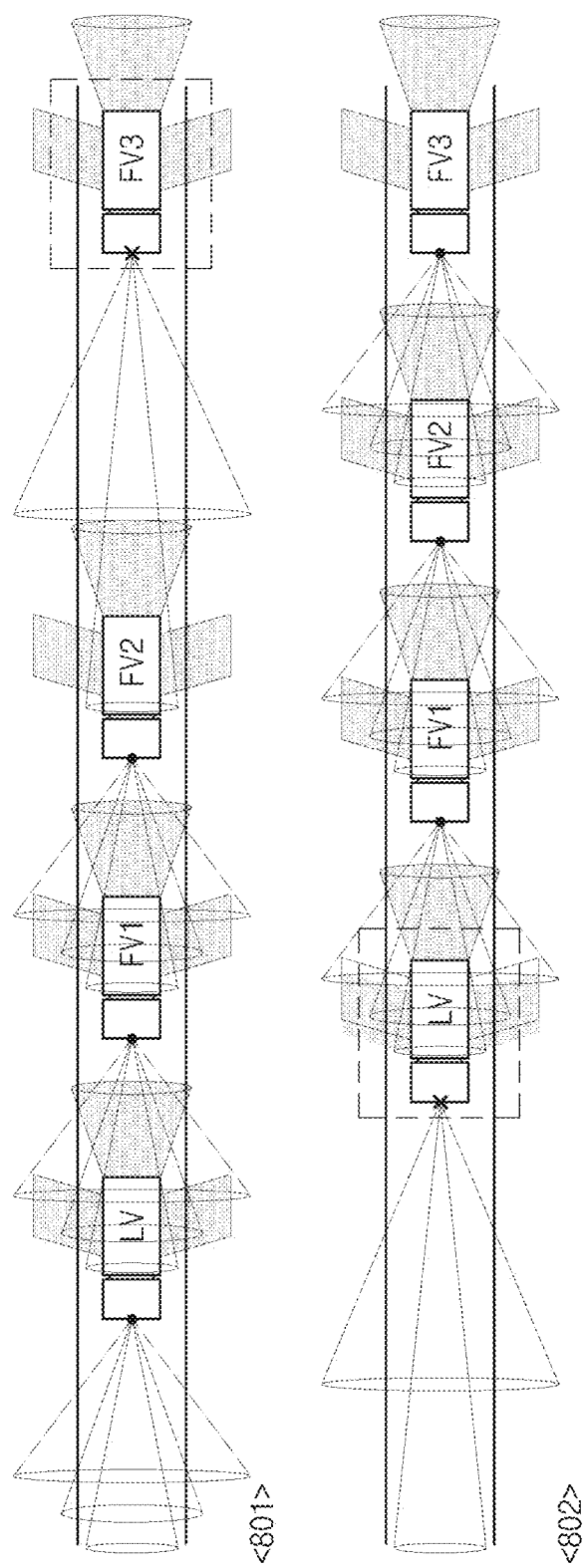
FIG. 8 is a drawing illustrating a specific screen, on which a platooning line is rearranged when a front LiDAR breaks down, according to an embodiment of the present disclosure.

FIG. 8 is a drawing illustrating a specific screen, on which a platooning line is rearranged when a front LiDAR breaks down, according to an embodiment of the present disclosure.

Referring to FIG. 8 and Table 1 above, a vehicle, including a broken front LiDAR, among platooning vehicles may cause deterioration in a function such as emergency braking, collision avoidance, or the like. Thus, when the vehicle, causing the deterioration in the function such as the emergency braking or the collision avoidance, is located in the middle of a platooning line, it is preferable for the vehicle to be located at the forefront of the platooning line. This is because it may collide with a preceding vehicle. Furthermore, the vehicle, causing the deterioration in the function such as the emergency braking or the collision avoidance, may be rearranged to be located at a tail end of the platooning line. A platooning controller 100 of FIG. 1 may control the vehicle to travel while maintaining a maximum inter-vehicle distance. In this embodiment, the inter-vehicle distance control step may be classified as a first step, a second step, a third step, or a fourth step of a headway state. The first step may have a shortest inter-vehicle distance. The inter-vehicle distance may be increased in an order of the second step, the third step, and the fourth step. The controlling to maintain the maximum inter-vehicle distance may include a controlling by using the fourth step of the headway state.

When no other vehicle, having a broken sensor, is present, the vehicle, including the broken front LiDAR, may be rearranged as a following vehicle FV3 at a tail end of the platooning line. When a blind spot radar of another vehicle breaks down, the vehicle, having the broken front LiDAR, may be rearranged as a leading vehicle LV at the forefront of the platooning line. This is because the position of the vehicle, having the broken blind spot radar, may be overlapped with the position of the following vehicle FV3 at the tail end of the platooning line.

When a front LiDAR of a host vehicle breaks down and a front radar of another vehicle breaks down, the host vehicle, including the broken front LiDAR, may depart from the platooning line. This is because, when the blind spot radar of the vehicle breaks down, it is impossible for the host vehicle to be rearranged in the location of the leading vehicle LV or the location of the following vehicle FV3 at the tail end of the platooning line.

Figure 9:
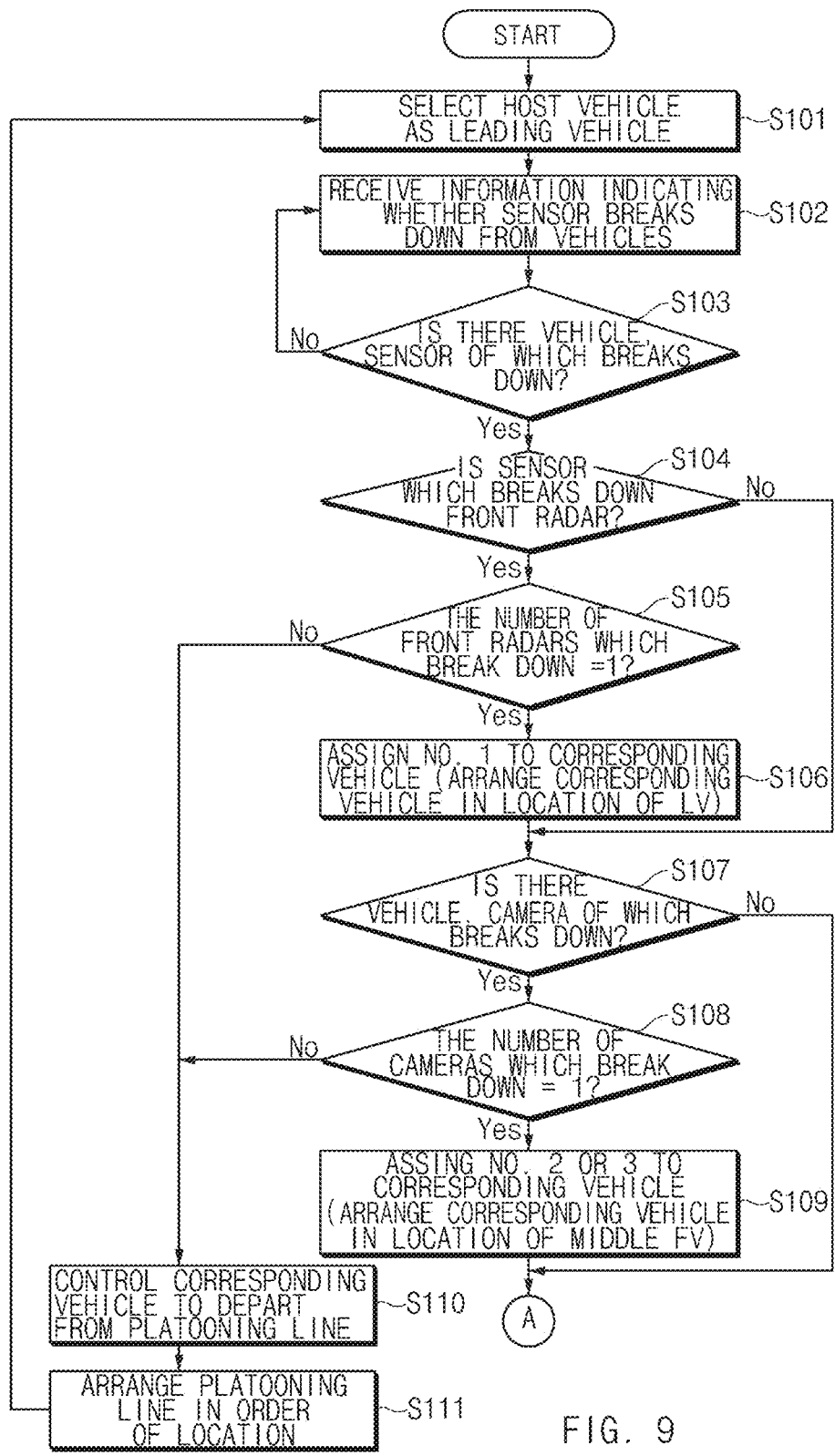
FIGS. 9 and 10 are flowcharts illustrating a method for controlling a platooning line depending on a type and a location of a broken sensing device in a vehicle according to an embodiment of the present disclosure.
Figure 10:
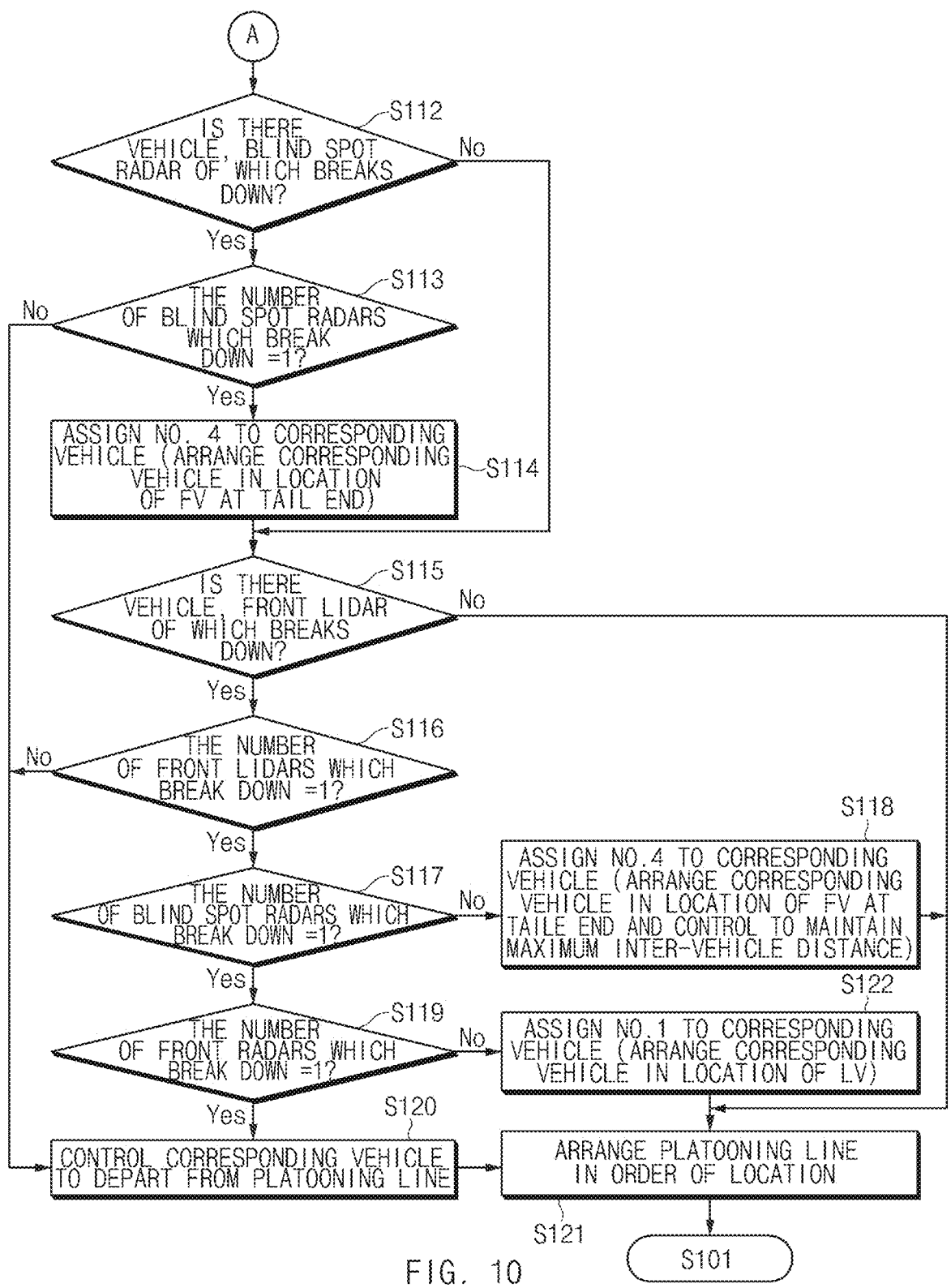

Hereinafter, a description is given in detail of a platooning method according to another embodiment of the present disclosure with reference to FIGS. 9 and 10. FIGS. 9 and 10 are flowcharts illustrating a platooning method according to another embodiment of the present disclosure.

Hereinafter, it is assumed that a platooning controller 100 of FIG. 1 performs a process of FIGS. 9 and 10. Furthermore, in the description of FIGS. 9 and 10, an operation described as being performed by an apparatus may be understood as being controlled by a processor 140 of the platooning controller 100.

When a host vehicle is selected as a leading vehicle for platooning in S101, in S102, the apparatus may receive information indicating whether a sensor breaks down from vehicles in a platooning line.

In S103, the apparatus may determine whether a vehicle, including a broken sensor, is present based on the information indicating whether the sensor breaks down. The information is received from the vehicles in the platooning line.

When the vehicle, having the broken sensor, is present among the vehicles in the platooning line, in S104, the apparatus may determine whether the broken sensor is a front radar.

When the broken sensor is the front radar, in S105, the apparatus may determine whether the number of the broken front radars is 1. When the number of the broken front radars is 1, in S106, the apparatus may assign No. 1 in the platooning line to the vehicle, having the broken front radar. In other words, the apparatus may rearrange the vehicle, having the broken front radar, in a location of a leading vehicle LV. Otherwise, when the number of the broken front radars is greater than 1, in other words, when two or more vehicles include the broken front radars, in S110, the apparatus may control the vehicles to depart from a platooning line. In S111, the apparatus may rearrange the platooning line including the other vehicles, which do not depart from the platooning line, in order of location.

In S107, the apparatus may determine whether a vehicle, including a broken camera, is present based on the information indicating whether the sensor breaks down. The information is received from the vehicles in the platooning line. When the vehicle, having the broken camera, is present, in S108, the apparatus may determine whether the number of the broken cameras is 1.

When the number of the broken cameras is 1, in S109, the apparatus may assign No. 2 or 3 in the platooning line to the vehicle, having the broken camera. In other words, when the camera breaks down, the vehicle, having the broken camera, may be rearranged in a location of a middle following vehicle. This is because it is difficult for the vehicle, having the broken camera, to travel as a leading vehicle. Otherwise, when the number of the broken cameras is greater than 1, in other words, when two or more vehicles include broken cameras, in S110, the apparatus may control the vehicles to depart from the platooning line. In S111, the apparatus may rearrange the platooning line including the other vehicles, which do not depart from the platooning line, in order of location.

In S112, the apparatus may determine whether a vehicle, including a blind spot radar, is present based on the information indicating whether the sensor breaks down. The information is received from the vehicles in the platooning line. When the vehicle, having the broken blind spot radar, is present, in S113, the apparatus may determine whether the number of the broken blind spot radars is 1.

When the number of the broken blind spot radars is 1, in S114, the apparatus may assign No. 4 in the platooning line to the vehicle, having the broken blind spot radar. In other words, when the blind spot radar breaks down, the vehicle, having the broken blind spot radar, may be rearranged at a tail end, which does not need a lane change. This is because it is difficult for the vehicle, having the broken blind spot radar, to detect another vehicle approaching to a rear end. Otherwise, when the number of the broken blind spot radars is greater than 1, in other words, when two or more vehicles include broken blind spot radars, in S120, the apparatus may control the vehicles to depart from the platooning line. In S121, the apparatus may rearrange the platooning line including the other vehicles, which do not depart from the platooning line, in order of location.

In S115, the apparatus may determine whether a vehicle, including a broken front LiDAR, is present based on the information indicating whether the sensor breaks down. The information is received from the vehicles in the platooning line. When the vehicle, having the broken front LiDAR, is present, in S116, the apparatus may determine whether the number of the broken front LiDARs is 1.

When the number of the broken front LiDARs is greater than 1, in other words, when two or more vehicles include broken front LiDARs, in S120, the apparatus may control the vehicles to depart from the platooning line. In S121, the apparatus may rearrange the platooning line including the other vehicles, which do not depart from the platooning line, in order of location.

Meanwhile, when the number of the broken front LiDARs is 1, in S117, the apparatus may determine whether the number of the broken blind spot radars is 1. When the number of the broken blind spot radars is not 1 (in other words, when the number of the broken blind spot radars is 0 or is greater than 1), in S118, the apparatus may assign No. 4, which is the tail end of the platooning line, to vehicles, including the broken blind spot radars. This is because there are several other vehicles, including blind spot radars. The apparatus may further drive the vehicles in a fourth step of the headway state.

Meanwhile, when the number of the broken front LiDARs is 1 and when the number of the broken blind spot radars is 1, in S119, the apparatus may determine whether the number of the broken front radars down is 1. When the number of the broken front LiDARs down is 1, when the number of the broken blind spot radars is 1, and when the number of the broken front radars is not 1, in S122, the apparatus may rearrange the vehicle, including the broken front radar, in the location of the leading vehicle, which has No. 1 in the platooning line.

When the number of the broken front LiDARs is 1, when the number of the broken blind spot radars is 1, and when the number of the broken front radars is 1, in S120, the apparatus may control the vehicle, having the broken front radar, to depart from the platooning line. In S121, the apparatus may rearrange the platooning line including the other vehicles, which do not depart from the platooning line, in order of location.

Thus, the present disclosure may maintain platooning although any of several types of sensors mounted for the ADAS breaks down during platooning. The present disclosure may further maintain platooning in response to breakdowns of a total of 4 sensors (e.g., a front LiDAR, a front radar, a blind spot radar, and a camera) as well as one type of sensor. Because the platooning may be maintained although the sensor breaks down, the present disclosure may save fuel efficiency and may enhance convenience of a driver.

Furthermore, the present disclosure may rearrange a vehicle, including a broken sensor, in a specific location in the platooning line. The rearrangement is based on a type, a location, and a sensing range of the broken sensor. In another embodiment, the present disclosure may control the vehicle, having the broken sensor, to depart from the platooning line. Thus, the platooning may be maintained.

Furthermore, the present disclosure may allow the leading vehicle to rearrange the platooning line in a manner to integrate sensor breakdown information and assign a number. The present disclosure may change the leading vehicle in a flexible manner, thus preventing a control entity from being confused.

Furthermore, the present disclosure may compare numbers of locations between vehicles upon platoon rearrangement, upon platoon departure, and when a new vehicle participating in the platooning is present. Thus, the present disclosure may immediately form a platoon again without confusion.

Figure 11:
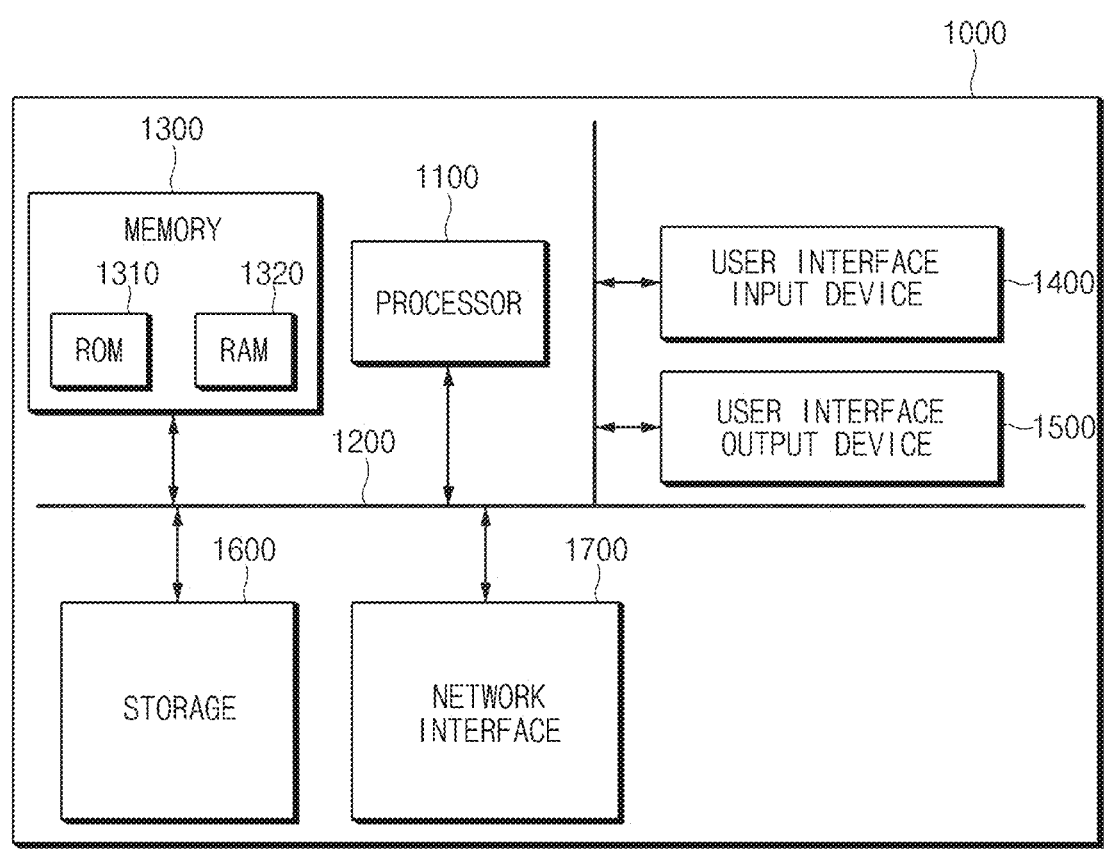
FIG. 11 is a block diagram illustrating a computing system according to an embodiment of the present disclosure.

FIG. 11 is a block diagram illustrating a computing system according to an embodiment of the present disclosure.

Referring to FIG. 11, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device configured to process instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (in other words, the memory 1300 and/or the storage 1600) such as a RAM memory, a flash memory, a ROM memory, an EPROM memory, an EEPROM memory, a register, a hard disk, a removable disk, and a CD-ROM.

The storage medium may be coupled to the processor 1100. The processor 1100 may read information out of the storage medium and may record information in the storage medium. In another embodiment, the storage medium may be integrated with the processor 1100. The processor 1100 and the storage medium may reside in an application specific integrated circuit (ASIC). The ASIC may reside within a user terminal. In another embodiment, the processor 1100 and the storage medium may reside in the user terminal as separate components.

The present disclosure may rearrange a platooning line with regard to types, locations, sensing ranges, and the like of one or more sensors when the one or more sensors of platooning vehicles break down and may maintain the platooning.

Furthermore, the present disclosure may change and apply a leading vehicle. The leading vehicle collects and integrates type and location information of a broken sensor. The leading vehicle further controls a location in the platooning line through a V2V communication, in a flexible manner. Thus, the authority of platooning control may be prevented from being duplicated or confused.

In addition, various effects directly or indirectly ascertained through the present disclosure may be provided.

Hereinabove, although the present disclosure has been described with reference to specific embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

Therefore, the specific embodiments of the present disclosure are provided to explain the spirit and scope of the present disclosure, but not to limit them. Thus, the spirit and scope of the present disclosure is not limited by the embodiments. The scope of the present disclosure should be construed on the basis of the accompanying claims. All the technical ideas within the scope equivalent to the claims should be included in the scope of the present disclosure.

What is claimed is:

1. A platooning controller, comprising:
    a communicator configured to transmit and receive sensor breakdown information between vehicles in a platooning line; and
    a processor configured to rearrange the platooning line depending on breakdown of sensors of the vehicles in the platooning line based on the sensor breakdown information,
    wherein the processor assigns a number according to a location of a vehicle in the platooning line depending on one or more of a type, a location, and/or a sensing range of a broken sensor and rearranges the vehicle in a location corresponding to the number.

2. The platooning controller of claim 1, wherein the processor rearranges a vehicle, which includes a broken front radar, in a location of a leading vehicle in the platooning line when the rearranged vehicle, including the broken front radar, is present among the sensors of the vehicles.

3. The platooning controller of claim 2, wherein the processor hands over control authority of an old leading vehicle to the rearranged vehicle, including the broken front radar when the rearranged vehicle, including the broken front radar, moves to the location of the leading vehicle.

4. The platooning controller of claim 1, wherein the processor rearranges a vehicle, which includes a broken camera, in a location of a following vehicle in the platooning line when the rearranged vehicle, including the broken camera, is present among the sensors of the vehicles.

5. The platooning controller of claim 1, wherein the processor rearranges a vehicle, which includes a broken blind spot radar, in a location of a tail end vehicle among following vehicles in the platooning line when the rearranged vehicle, including the broken blind spot radar, is present among the sensors of the vehicles.

6. The platooning controller of claim 1, wherein the processor rearranges a vehicle, which includes a broken front light detection and ranging (LiDAR), in a location of a tail end vehicle among following vehicles in the platooning line or a location of a leading vehicle in the platooning line when the rearranged vehicle, including the broken front LiDAR, is present among the sensors of the vehicles.

7. The platooning controller of claim 6, wherein the processor rearranges the vehicle, including the broken front LiDAR, in the location of the tail end vehicle among the following vehicles in the platooning line when no other vehicle, which includes a broken sensor, is present among the vehicles in the platooning line.

8. The platooning controller of claim 7, wherein the processor controls the vehicle, including the broken front LiDAR and rearranged in the location of the tail end vehicle among the following vehicles in the platooning line, to maintain a maximum inter-vehicle distance.

9. The platooning controller of claim 6, wherein the processor rearranges the vehicle, including the broken front LiDAR, in the location of the leading vehicle in the platooning line when another vehicle, which includes a broken blind spot radar, is present among the vehicles in the platooning line.

10. The platooning controller of claim 6, wherein the processor controls the rearranged vehicle, including the broken front LiDAR, to depart from the platooning line when another vehicle, which includes a broken blind spot, and another vehicle, which includes a broken front radar, are present among the vehicles in the platooning line.

11. The platooning controller of claim 1, further comprising:
a display configured to display information for platooning.

12. A vehicle system, comprising:
a sensing device configured to sense a periphery of a host vehicle; and
a platooning controller configured to transmit and receive sensor breakdown information between vehicles in a platooning line and rearrange the platooning line depending on breakdown of sensors of the vehicles in the platooning line based on the sensor breakdown information,
wherein the platooning controller assigns a number according to a location of a vehicle in the platooning line depending on one or more of a type, a location, and/or a sensing range of a broken sensor and rearranges the vehicle in a location corresponding to the number.

13. The vehicle system of claim 12, wherein the sensing device includes:
a front radar configured to sense a long range obstacle in front of the host vehicle;
a camera configured to obtain lane information;
a blind spot radar configured to sense an obstacle approaching to a rear end of the host vehicle; and
a front LiDAR configured to sense a collision with an obstacle in front of the host vehicle.

14. The vehicle system of claim 12, wherein the platooning controller rearranges a vehicle, which includes a broken front radar, in a location of a leading vehicle in the platooning line and hands over a control authority of an old leading vehicle to the rearranged vehicle, including the broken front radar, when the rearranged vehicle, including the broken front radar, is present among the sensors of the vehicles.

15. The vehicle system of claim 12, wherein the platooning controller rearranges a vehicle, which includes a broken camera, in a location of a following vehicle in the platooning line when the rearranged vehicle, including the broken camera, is present among the sensors of the vehicles.

16. The vehicle system of claim 12, wherein the platooning controller rearranges a vehicle, which includes a broken blind spot radar, in a location of a tail end vehicle among following vehicles in the platooning line when the rearranged vehicle, including the broken blind spot radar, is present among the sensors of the vehicles.

17. The vehicle system of claim 12, wherein the platooning controller rearranges a vehicle, which includes a broken front LiDAR, in a location of a tail end vehicle among following vehicles in the platooning line or a location of a leading vehicle in the platooning line when the rearranged vehicle, including the broken front LiDAR, is present among the sensors of the vehicles.

18. A platooning control method, comprising:
transmitting and receiving sensor breakdown information between vehicles in a platooning line;
assigning a number according to a location of a vehicle in the platooning line depending on one or more of a type, a location, and/or a sensing range of a broken sensor based on the sensor breakdown information; and
rearranging the vehicle in a location corresponding to the number.

19. The platooning control method of claim 18, wherein the assigning of the number according to the location of each vehicle includes:
rearranging a vehicle, which includes a broken front radar, in a location of a leading vehicle in the platooning line and handing over control authority of an old leading vehicle to the rearranged vehicle, including the broken front radar, when the rearranged vehicle, including the broken front radar, is present among sensors of the vehicles.

20. The platooning control method of claim 18, wherein the assigning of the number according to the location of each vehicle includes:
rearranging a vehicle, which includes a broken camera, in a location of a following vehicle in the platooning line when the rearranged vehicle, including the broken camera, is present among sensors of the vehicles.

* * * * *